United States Patent
DeLuca et al.

(10) Patent No.: US 11,145,097 B2
(45) Date of Patent: *Oct. 12, 2021

(54) CHANGING VIEW ORDER OF AUGMENTED REALITY OBJECTS BASED ON USER GAZE

(71) Applicant: International Business Machines Corporation, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/589,190

(22) Filed: Oct. 1, 2019

(65) Prior Publication Data
US 2020/0035006 A1    Jan. 30, 2020

Related U.S. Application Data

(63) Continuation of application No. 15/819,571, filed on Nov. 21, 2017, now Pat. No. 10,586,360.

(51) Int. Cl.
*G06T 11/60* (2006.01)
*G06F 3/01* (2006.01)
(Continued)

(52) U.S. Cl.
CPC .............. *G06T 11/60* (2013.01); *G06F 3/011* (2013.01); *G06F 3/013* (2013.01); *G06F 3/017* (2013.01);
(Continued)

(58) Field of Classification Search
CPC . G06T 11/60; G06T 2210/62; G06T 2200/24; G06F 3/011; G06F 3/013; G06F 3/017; G06F 3/04815; G06F 3/167
See application file for complete search history.

(56) References Cited

U.S. PATENT DOCUMENTS

| 5,040,888 A | 8/1991 | Bonham |
| 5,329,986 A | 7/1994 | Wu |

(Continued)

FOREIGN PATENT DOCUMENTS

| CA | 2498107 A1 | 3/2004 |
| WO | 2014099231 A2 | 6/2014 |

OTHER PUBLICATIONS

Appendix P, "List of IBM Patents or Patent Applications Treated as Related", Mar. 26, 2020, 2 pages.
(Continued)

*Primary Examiner* — Yu Chen
(74) *Attorney, Agent, or Firm* — Maeve M. Carpenter; Maxine L. Barasch; Keohane & D'Alessandro, PLLC

(57) ABSTRACT

Disclosed embodiments provide techniques for adjusting the Z-index of an augmented reality (AR) object. When an AR object covers a first object, the user gazes at the first object for a predetermined amount of time, and then the AR object Z-index is adjusted with respect to the Z-index of the first object, such that the AR object is now rendered behind the first object, such that the user can continue to view the first object. The first object can be a physical object, a virtual object, or another augmented reality object. This allows the user to conveniently continue viewing the first object. Embodiments provide techniques for reverting the Z-index of the AR object at a later time when the user is ready to respond to the AR object. In this way, the user experience for augmented reality systems is enhanced.

20 Claims, 12 Drawing Sheets

(51) Int. Cl.
*G06F 3/0481* (2013.01)
*G06F 3/16* (2006.01)

(52) U.S. Cl.
CPC .......... *G06F 3/04815* (2013.01); *G06F 3/167* (2013.01); *G06T 2200/24* (2013.01); *G06T 2210/62* (2013.01)

(56) References Cited

U.S. PATENT DOCUMENTS

| | | | |
|---|---|---|---|
| 5,528,735 | A | 6/1996 | Strasnick et al. |
| 6,329,986 | B1 | 12/2001 | Cheng |
| 7,109,998 | B2 | 9/2006 | Smith |
| 7,720,932 | B2 | 5/2010 | Wei et al. |
| 8,448,092 | B2 | 5/2013 | DeLuca et al. |
| 8,743,145 | B1 | 6/2014 | Price |
| 9,257,089 | B2 | 2/2016 | Ur |
| 9,563,983 | B2 | 2/2017 | Bean et al. |
| 9,679,417 | B1 | 6/2017 | Ross |
| 9,710,970 | B2 | 7/2017 | Jung et al. |
| 9,922,253 | B2 | 3/2018 | Asbun et al. |
| 2004/0045204 | A1 | 3/2004 | Miano et al. |
| 2006/0232665 | A1 | 10/2006 | Schowengerdt et al. |
| 2012/0206452 | A1* | 8/2012 | Geisner ............... H04S 7/304 345/419 |
| 2013/0050432 | A1 | 2/2013 | Perez et al. |
| 2013/0093787 | A1 | 4/2013 | Fulks et al. |
| 2013/0145304 | A1 | 6/2013 | DeLuca et al. |
| 2013/0278631 | A1 | 10/2013 | Border et al. |
| 2014/0168056 | A1* | 6/2014 | Swaminathan ......... G06F 3/147 345/156 |
| 2014/0168262 | A1 | 6/2014 | Forutanpour et al. |
| 2014/0247281 | A1 | 9/2014 | Ellenby |
| 2014/0282144 | A1 | 9/2014 | Maciocci |
| 2015/0220157 | A1 | 8/2015 | Marggraff et al. |
| 2015/0338915 | A1 | 11/2015 | Publicover et al. |
| 2016/0025971 | A1 | 1/2016 | Crow et al. |
| 2016/0027221 | A1 | 1/2016 | Blanchflower et al. |
| 2016/0085301 | A1 | 3/2016 | Lopez |
| 2016/0155267 | A1 | 6/2016 | Bean et al. |
| 2017/0124928 | A1 | 3/2017 | Edwin et al. |
| 2017/0102545 | A1 | 4/2017 | Hua et al. |
| 2017/0124769 | A1 | 5/2017 | Saito |
| 2017/0237974 | A1* | 8/2017 | Samec ................... G06F 3/011 348/53 |
| 2017/0277374 | A1 | 9/2017 | Ozcan et al. |
| 2017/0365100 | A1 | 12/2017 | Walton |
| 2018/0054562 | A1 | 2/2018 | Li et al. |
| 2018/0082117 | A1 | 3/2018 | Sharma et al. |
| 2018/0088323 | A1* | 3/2018 | Bao ..................... G02B 27/0093 |
| 2018/0095942 | A1 | 4/2018 | Singh et al. |
| 2018/0315248 | A1* | 11/2018 | Bastov ................. G06T 19/006 |
| 2018/0330531 | A1 | 11/2018 | Mullins |
| 2019/0156535 | A1 | 5/2019 | DeLuca et al. |

OTHER PUBLICATIONS

Borkowski, Stanislaw et al., "Spatial Control of Interactive Surfaces in an Augmented Environment", EHCI/DS-VIS, 2004, 15 pgs.

Butkiewicz Michael et al., "Klotski: Reprioritizing Web Content to Improve User Experience on Mobile Devices", Proceedings of the 12th USENIX Symposium on Networked Systems Design and Implementation (NSDI '15), May 4-6, 2015, 16 pgs.

Unknown, "Augmented Reality Overlays interfering with physical objects in the real world", IP.com Prior Art Database Technical Disclosure, IPCOM000245242D, Feb. 19, 2016, 2 pgs.

Unknown, "AWE 2016: Augmented Reality Glasses with Eye Tracking", http://singlegadget.com/awe-2016-augmented-reality-glasses-eyetracking/, 2016, 3 pgs.

Unknown, "Visual Recognition", https://www.ibm.com/watson/services/visual-recognition/, Sep. 2017, 6 pgs.

Barasch, Maxine, List of IBM Patents or Patent Application Treated as Related, Dec. 28, 2017, 1 page.

Kalkofen, Denis et al., "Visualization Techniques for Augmented Reality", Chapter 3, Handbook of Augmented Reality, Jul. 13, 2011, pp. 65-98.

Neumann, Ulrich et al., "Tracking for Augmented Reality on Wearable Computers", Virtual Reality, vol. 3, Issue 3, Sep. 1998, 23 pages.

Anonymous, "Displaying large models in augmented reality", IP.Com Prior Art Database Technical Disclosure, IPCOM000236647D, May 7, 2014, 5 pages.

Anonymous, "Method for Remote Object Search and Viewing using Augmented Reality Glasses", IP.Com Prior Art Database Technical Disclosure, IPCOM000240512D, Feb. 4, 2015, 4 pages.

Anonymous, "Situated Augmented Reality", IP.Com Prior Art Database Technical Disclosure, IPCOM000239026D, Oct. 2, 2014, 2 pages.

Bilenko, Mikhail et al., "Adaptive Product Normalization: Using Online Learning for Record Linkage in Comparison Shopping", Proceedings of the 5th International Conference on Data Mining (ICDM-2005), Nov. 2005, pp. 58-65.

Anonymous, "System and method of reorganizing text in image (screen shot or picture) with the image is being resized", IP.Com Prior Art Database Technical Disclosure, IPCOM000215227D, Feb. 22, 2012, 13 pages.

Jain, Puneet et al., "OverLay: Practical Mobile Augmented Reality", MobiSys '15, May 18, 2015, 14 pages.

Watfa, Allie et al., "A Method and System for Displaying a Personalized Advertisement Containing User Content", IP.Com Prior Art Database Technical Disclosure, IPCOM000237438D, Jun. 18, 2014, 3 pages.

Zhu Wei et al "Personalized In-store E-Commerce with the PromoPad: an Augmented Reality Shopping Assistant", Electronic Journal for E-Commerce Tools and Applications 1.3, Jan. 2004, pp. 1-19.

Yu Chen, USPTO Office Action, U.S. Appl. No. 15/819,571, dated Feb. 4, 2019, 36 pages.

Yu Chen, USPTO Notice of Allowance and Fee(s) Due, U.S. Appl. No. 15/819,571, dated Jul. 1, 2019, 20 pages.

Yu Chen, USPTO Notice of Allowance and Fee(s) Due, U.S. Appl. No. 15/819,571, dated Oct. 22, 2019, 13 pages.

\* cited by examiner

CHANGING VIEW ORDER OF AUGMENTED REALITY OBJECTS BASED ON USER GAZE

CROSS-REFERENCE TO RELATED APPLICATIONS

The present patent document is a continuation of U.S. patent application Ser. No. 15/819,571, filed Nov. 21, 2017, entitled "CHANGING VIEW ORDER OF AUGMENTED REALITY OBJECTS BASED ON USER GAZE", the entire contents of which is incorporated herein by reference.

FIELD OF THE INVENTION

Embodiments relate to augmented reality, and more particularly to changing the view order of augmented reality objects based on user gaze.

BACKGROUND

Augmented reality allows people to view their surroundings in the real world, usually through a set of eyeglasses and/or a screen, supplemented with virtual (i.e., augmented reality) images. This allows for an enhanced experience for the person exploring his/her surroundings. In some cases, though, a virtual image may obscure a real object or another virtual image that the user is interested in looking at. This may cause confusion and frustration for the user, as well as reduces efficiency. Accordingly, there exists a need for improvements in augmented reality systems and methods.

SUMMARY

In one aspect, there is provided a computer-implemented method for controlling a Z-index of an augmented reality object in an augmented reality system, the method comprising: detecting a first object as currently focused on by a user; detecting the presence of an overlapping augmented reality object that obstructs a view of the first object; and, responsive to the user maintaining gaze on the first object for at least a predetermined period of time, adjusting the Z-index for the augmented reality object.

In another aspect, there is provided an electronic communication device comprising: a forward-facing digital camera; a user-facing digital camera; a processor; a memory coupled to the processor, the memory containing instructions, that when executed by the processor, perform the steps of: detecting a first object as currently focused on by a user; detecting the presence of an overlapping augmented reality object that obstructs a view of the first object; and, responsive to the user maintaining gaze on the first object for at least a predetermined period of time, adjusting a Z-index for the augmented reality object.

In yet another aspect, there is provided a computer program product for controlling a Z-index of an augmented reality object in an augmented reality system, for an electronic computing device comprising a computer readable storage medium having program instructions embodied therewith, the program instructions executable by a processor to cause the electronic computing device to: detect a first object as currently focused on by a user; detect the presence of an overlapping augmented reality object that obstructs a view of the first object; and, responsive to the user maintaining gaze on the first object for at least a predetermined period of time, adjusting a Z-index for the augmented reality object.

BRIEF DESCRIPTION OF THE DRAWINGS

Features of the disclosed embodiments will be more readily understood from the following detailed description of the various aspects of the invention taken in conjunction with the accompanying drawings.

Figure 1:
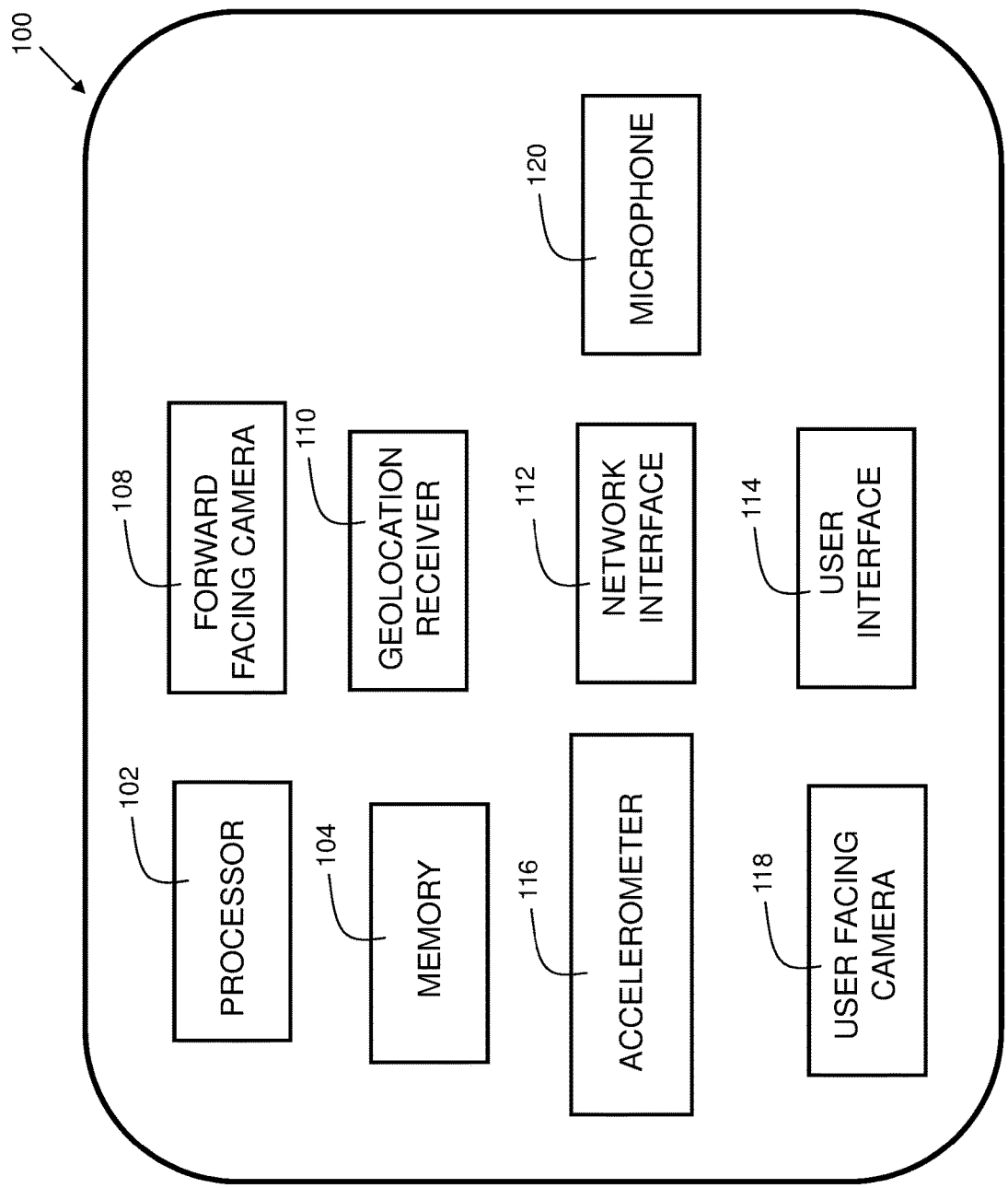
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for adjusting the Z-index of an augmented reality (AR) object. The Z-index is an indication of where an object is displayed with respect to other objects in terms of foreground and background. As an example, a Z-index of zero may indicate an object that is in front of any other object, a Z-index of one may indicate an object that is rendered as behind objects with a Z-index of zero, and in front of any objects with a Z-index of two or higher. In some embodiments, when an AR object covers a first object, the user gazes in the direction of the first object for a predetermined amount of time, and then the AR object Z-index is adjusted with respect to the Z-index of the first object, such that the AR object is now rendered behind the first object, such that the user can continue to view the first object. The first object can be a physical object, a virtual reality object, or another augmented reality object. This allows the user to conveniently continue viewing the first object. Embodiments provide techniques for reverting the Z-index of the AR object at a later time when the user is ready to respond to the AR object. In this way, the user experience for augmented reality systems is enhanced.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a block diagram of a device in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, memory 104 may not be a transitory signal per se. Memory 104 includes instructions, which when executed by the processor, implement steps of the present invention. In embodiments, device 100 may have multiple processors 102, and/or multiple cores per processor.

Device 100 further includes a user interface 114. In some embodiments, the user interface may include a display system, which may include one or more displays, examples of which include a liquid crystal display (LCD), a plasma display, a cathode ray tube (CRT) display, a light emitting diode (LED) display, an organic LED (OLED) display, or other suitable display technology. The user interface 114 may include a keyboard, mouse, and/or a touch screen, incorporating a capacitive or resistive touch screen in some embodiments. The device 100 further includes a microphone 120. The device 100 further includes a user-facing camera 118 and a forward-facing camera 108.

Device 100 further includes a network interface 112. In some embodiments, the network interface 112 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted.

The device 100 may further include an accelerometer 116. The accelerometer may be bulk micromachined capacitive, bulk micromachined piezoelectric resistive, capacitive spring mass system base, DC response, electromechanical servo (Servo Force Balance), high gravity, high temperature, laser accelerometer, or other suitable type.

The device 100 may further include a geolocation receiver 110. Geolocation receiver 110 can operate with one or more of GPS, Galileo, GLONASS, or other system now known or hereafter developed.

Figure 2:
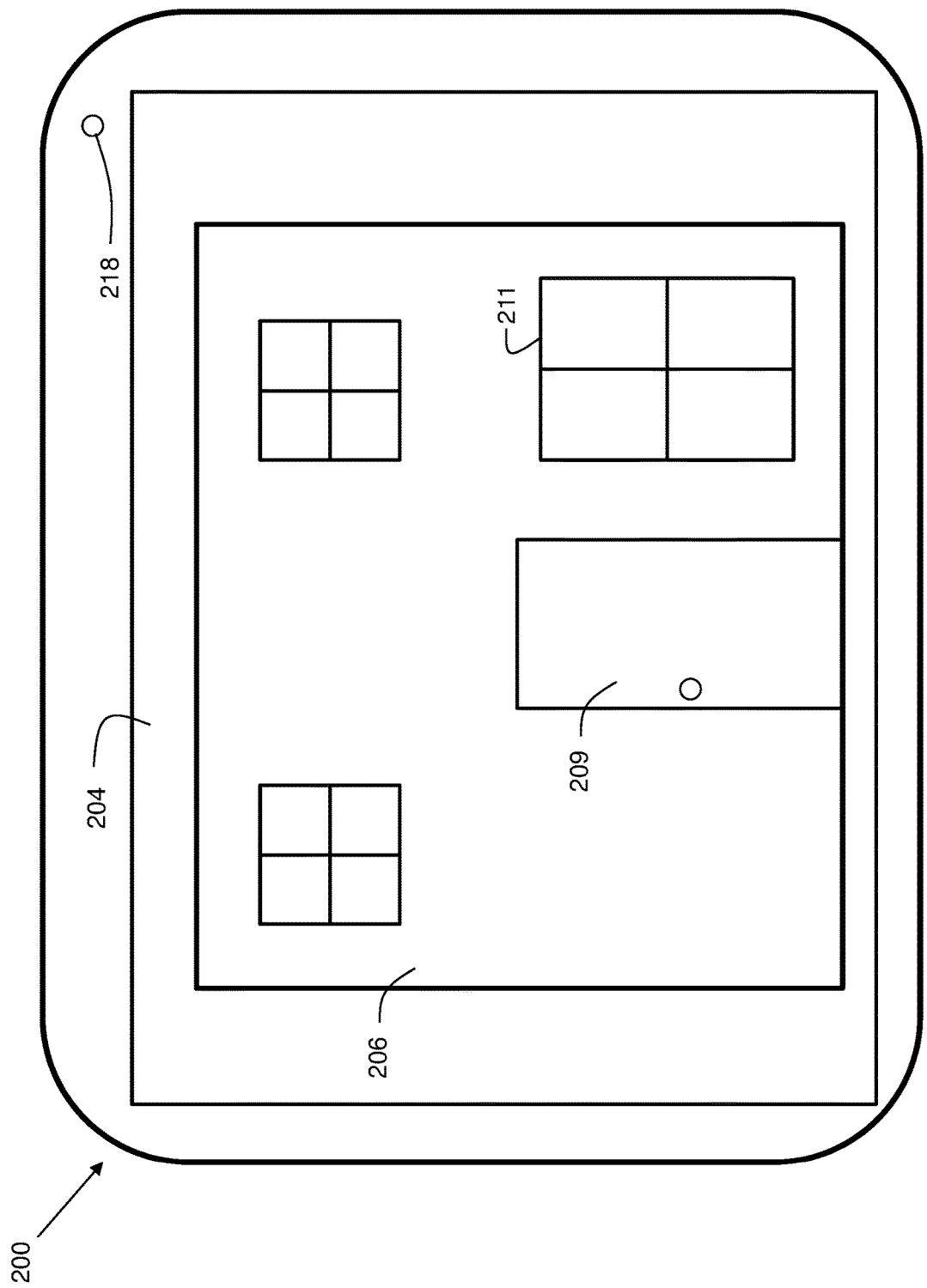
FIG. 2 is an exemplary device in accordance with embodiments of the present invention.

FIG. 2 is an exemplary device 200 in accordance with embodiments of the present invention. Device 200 includes display 204 and user-facing camera 218. This camera faces the user when the user is looking at the display 204 of device 200. In the example, on the display 204 is an image of a house 206 having a door 209 and a window 211. The house 206 may be a real house captured by a forward-facing camera (a camera that faces forward when the user is looking at display 204), or a virtual house.

Figure 3:
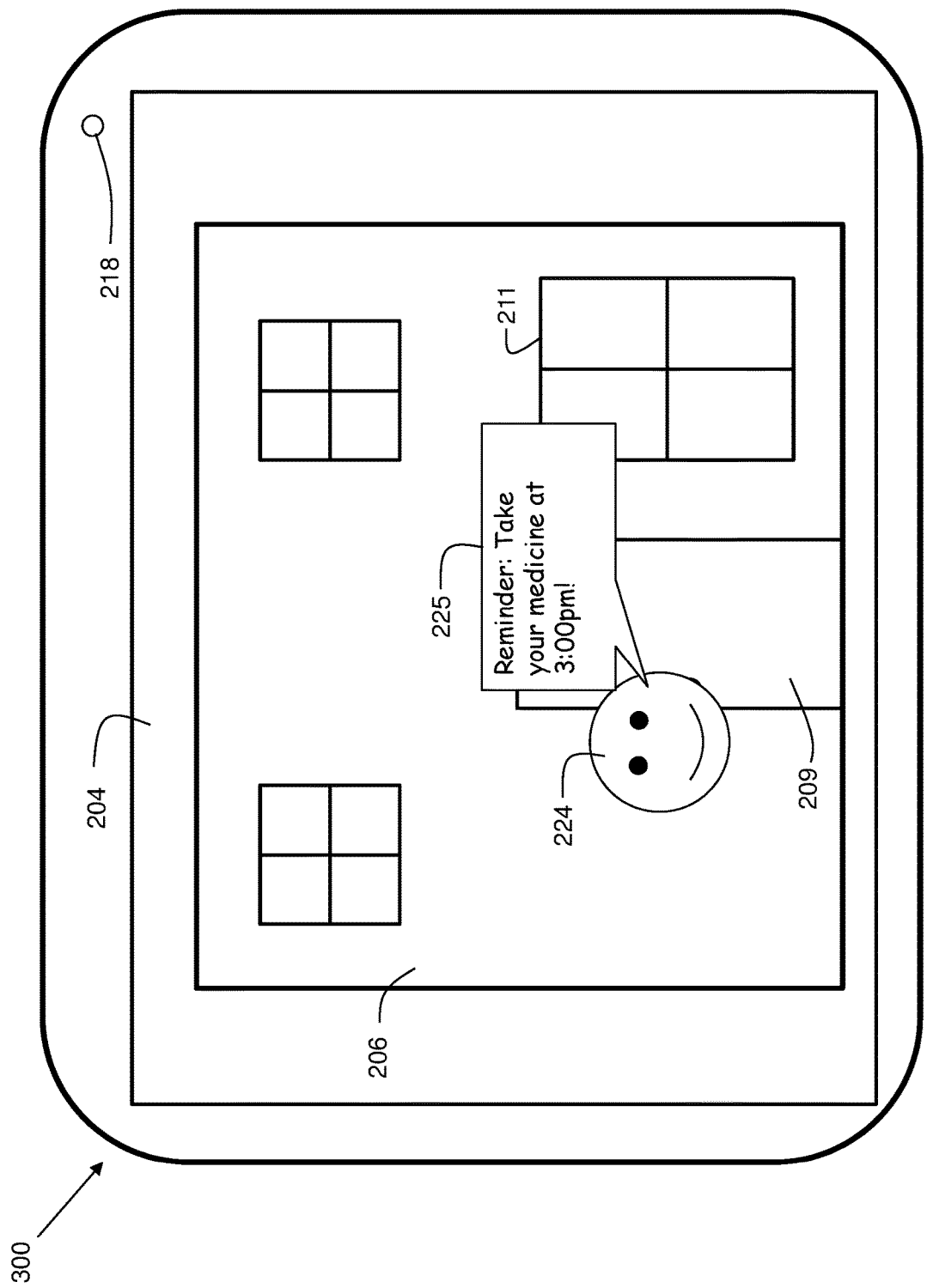
FIG. 3 is an exemplary display of an augmented reality object rendered on a device in accordance with embodiments of the present invention.

FIG. 3 is an exemplary display of an augmented reality object rendered on device 300 in accordance with embodiments of the present invention. In embodiments, it is detected that a user's gaze is currently focused on a first object. The detecting is implemented by analysis of imagery captured by the user facing camera 218. In embodiments, it is detected that an overlapping AR object is present that obstructs the view of the first object. In the example, there are two AR objects, including character 224 and text box 225. These AR objects 224 and 225 obscure portions of door 209 and window 211.

Figure 4A:
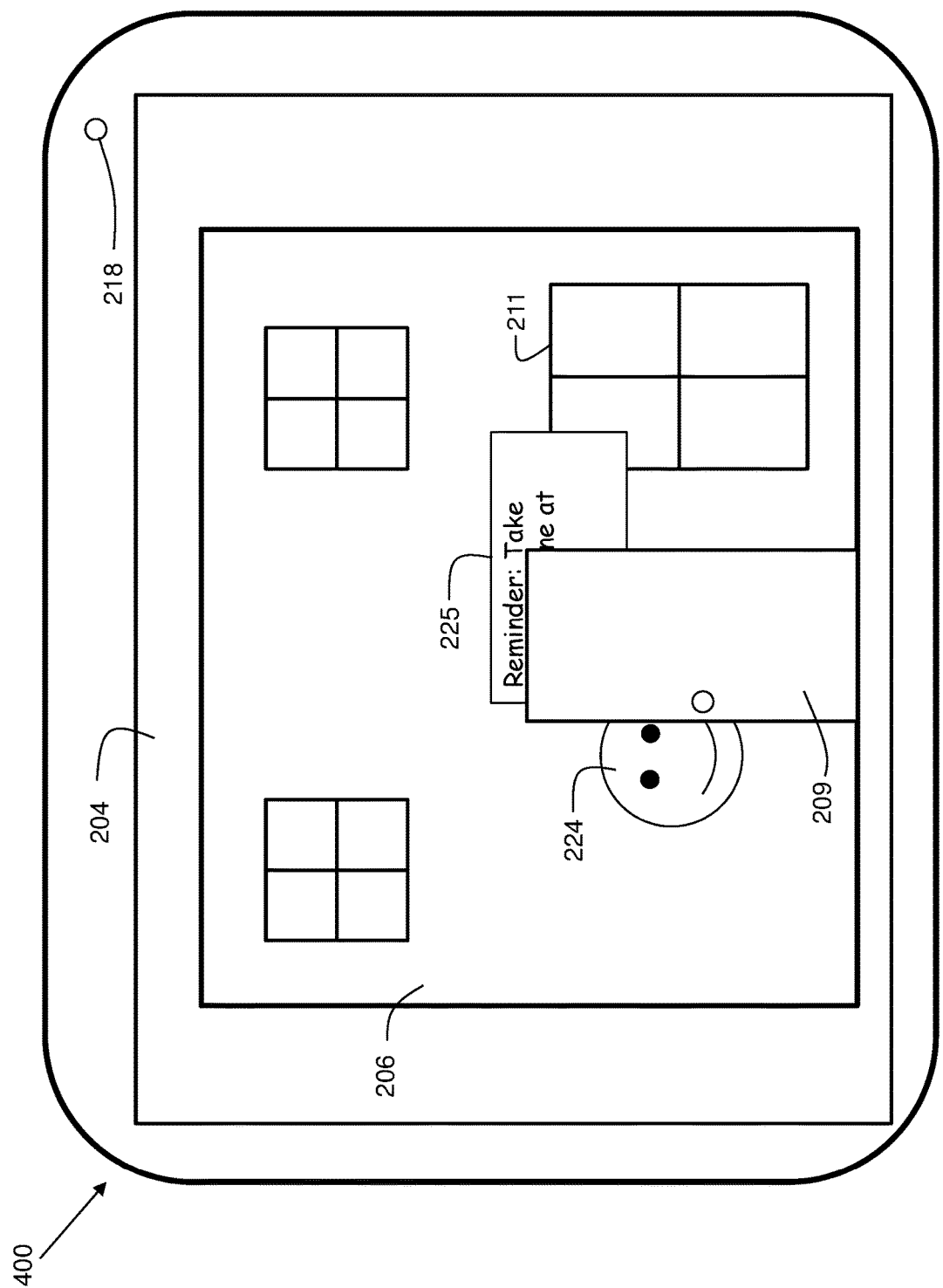
FIG. 4A is an exemplary display of an augmented reality object with an adjusted Z-index rendered on a device in accordance with embodiments of the present invention.

FIG. 4A is an exemplary display 400 of an augmented reality object with an adjusted Z-index rendered on a device in accordance with embodiments of the present invention. In embodiments, responsive to the user maintaining gaze on the first object for at least a predetermined period of time, a new Z-index is set for the augmented reality object. The Z-index is an indication of where an object is displayed with respect to other objects in terms of foreground and background.

In some embodiments, adjusting the Z-index includes changing an opacity parameter for the augmented reality object. In embodiments, an AR object "goes behind another object" by setting the AR object's pixels to transparent in an overlap region. In some embodiments, alpha compositing may be used. In the example, pixels are of the RGBA model. Accordingly, the pixel color includes a red, green, and blue component, along with an alpha channel. The alpha channel indicates transparency, ranging from opaque to invisible. A pixel having a value of 0% in its alpha channel is completely transparent. This means it is invisible. A pixel having a value of 100% in its alpha channel is completely opaque. Values may be set anywhere between 0 and 100%, allowing for no, full, or partial transparency of pixels. Alpha of a pixel may be set to transparent when set "behind" another object, and opaque when set in "front" of another object. Thus, the transparency adjustment can be performed on a pixel-by-pixel basis. It should be recognized that any type of pixel formats and compositing processes may be substituted where feasible.

In the example, the predetermined period of time, after which Z-index adjustment is triggered, is six seconds. It is detected (by analysis of imagery from user-facing camera 218) that, after the AR objects 224 and 225 appear, the user's gaze focuses on door 209 for at least six seconds. Accordingly, the Z-indexes for the AR objects 224 and 225 are adjusted. The alpha channels for the pixels of AR objects 224 and 225 that overlap with the door 209, are set to a value of zero (i.e., transparent). This means that the AR objects 224 and 225 are moved from in front of, to behind, the door 209. AR object text box 225 remains in front of the window because the user eye gaze is directed at the door 209.

Figure 4B:
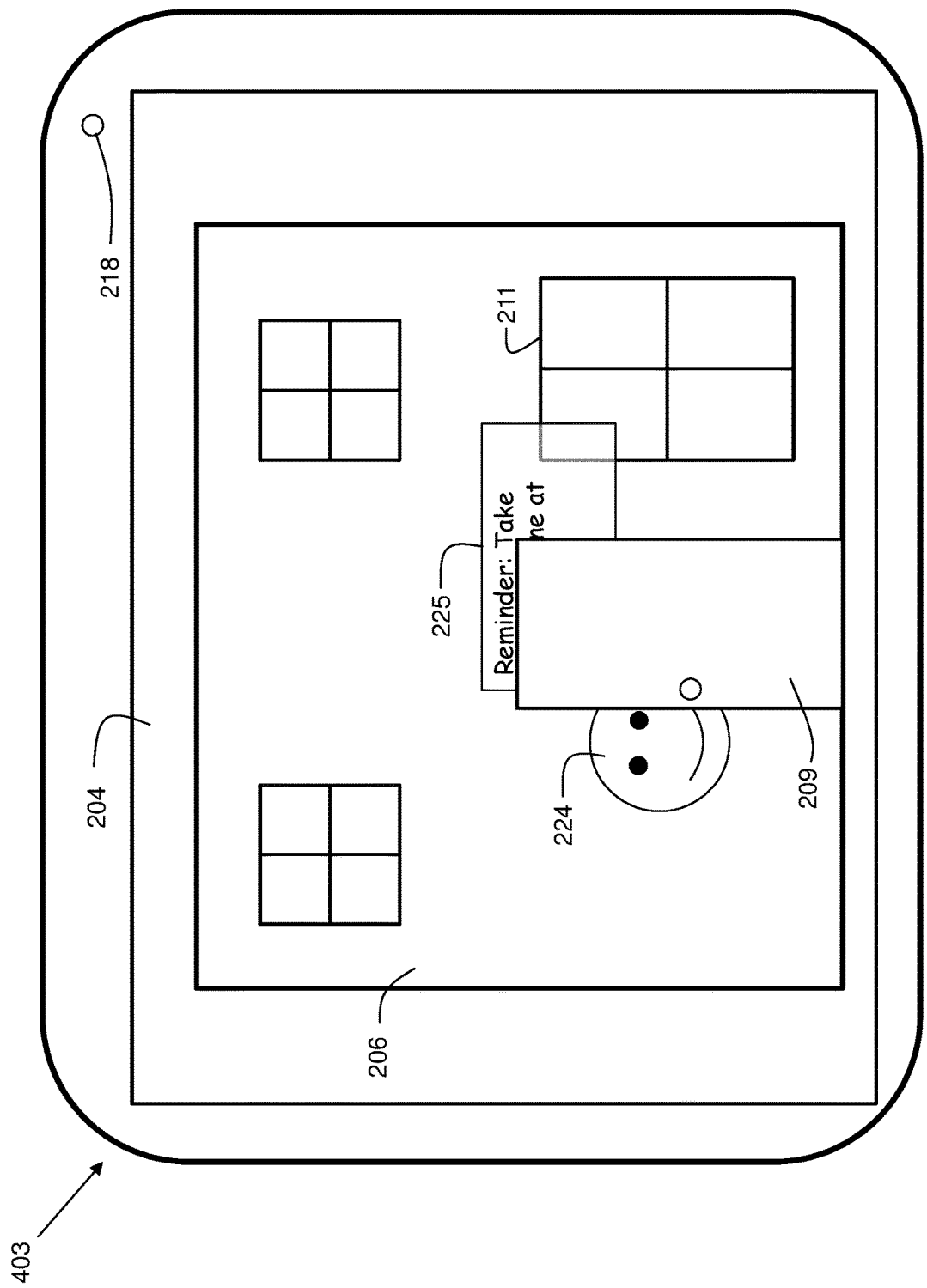
FIG. 4B is an exemplary display of an augmented reality object with an adjusted Z-index rendered on a device in accordance with embodiments of the present invention.

FIG. 4B is an exemplary display 403 of an augmented reality object with an adjusted Z-index rendered on a device in accordance with additional embodiments of the present invention. In the example, the user moves his/her gaze to AR object 225. S/he stares at it for six seconds. Accordingly, the Z-index is adjusted for AR object 225 to cause it to be behind the door 209, but in front of window 211, as was the case for FIG. 4A. However, in the case of FIG. 4B, the opacity parameter (alpha channel) is adjusted such that the AR object 225 is partially transparent in front of window 211. Accordingly, here, instead of the alpha channel of the pixels that overlap with the window being set to 0 for complete transparency, they are instead set at a mid-level between transparent and opaque to allow partial transparency. Accordingly, the pixels of the window are still visible to an extent even though AR object 225 partially overlaps it.

Figure 4C:
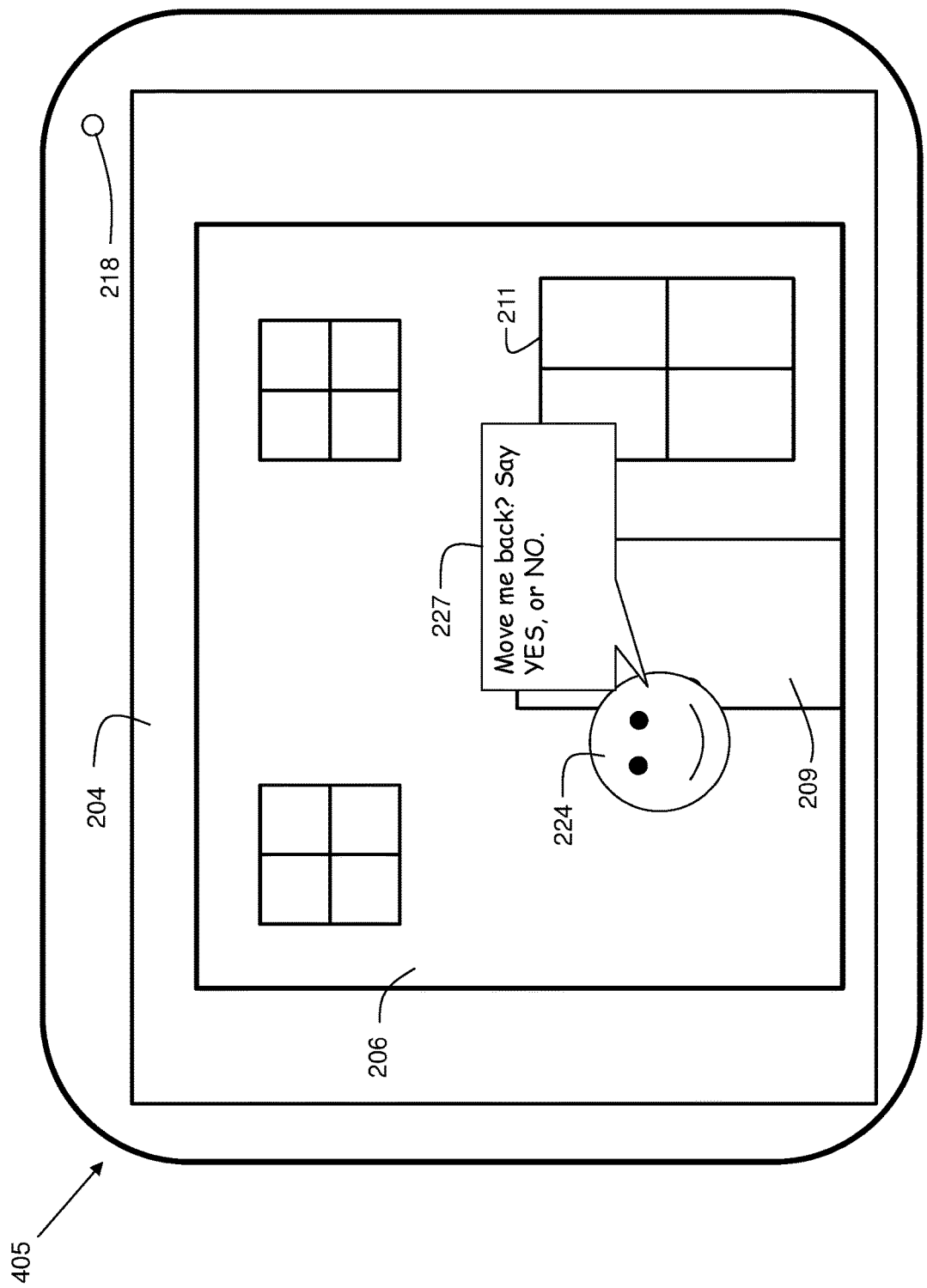
FIG. 4C is an exemplary display of an augmented reality object with a confirmation message rendered on a device in accordance with embodiments of the present invention.

FIG. 4C is an exemplary display 405 of an augmented reality object with a confirmation message rendered on a device in accordance with embodiments of the present invention. In embodiments, a confirmation message is rendered prior to setting the new Z-index for the augmented reality object. In the example, instead of automatically adjusting the Z-index for the AR object in response to detecting user gaze for the period of time, a confirmation message is displayed to determine whether the user wants the adjustment. In the example, text box 227 is displayed requesting confirmation from the user as to whether the text box should be moved back. The user can answer by a voice command, or by eye gazing on the "YES" or "NO" areas, or any other gesture or suitable user input. Thus, embodiments can include rendering a confirmation message prior to setting the new Z-index for the augmented reality object.

Figure 4D:
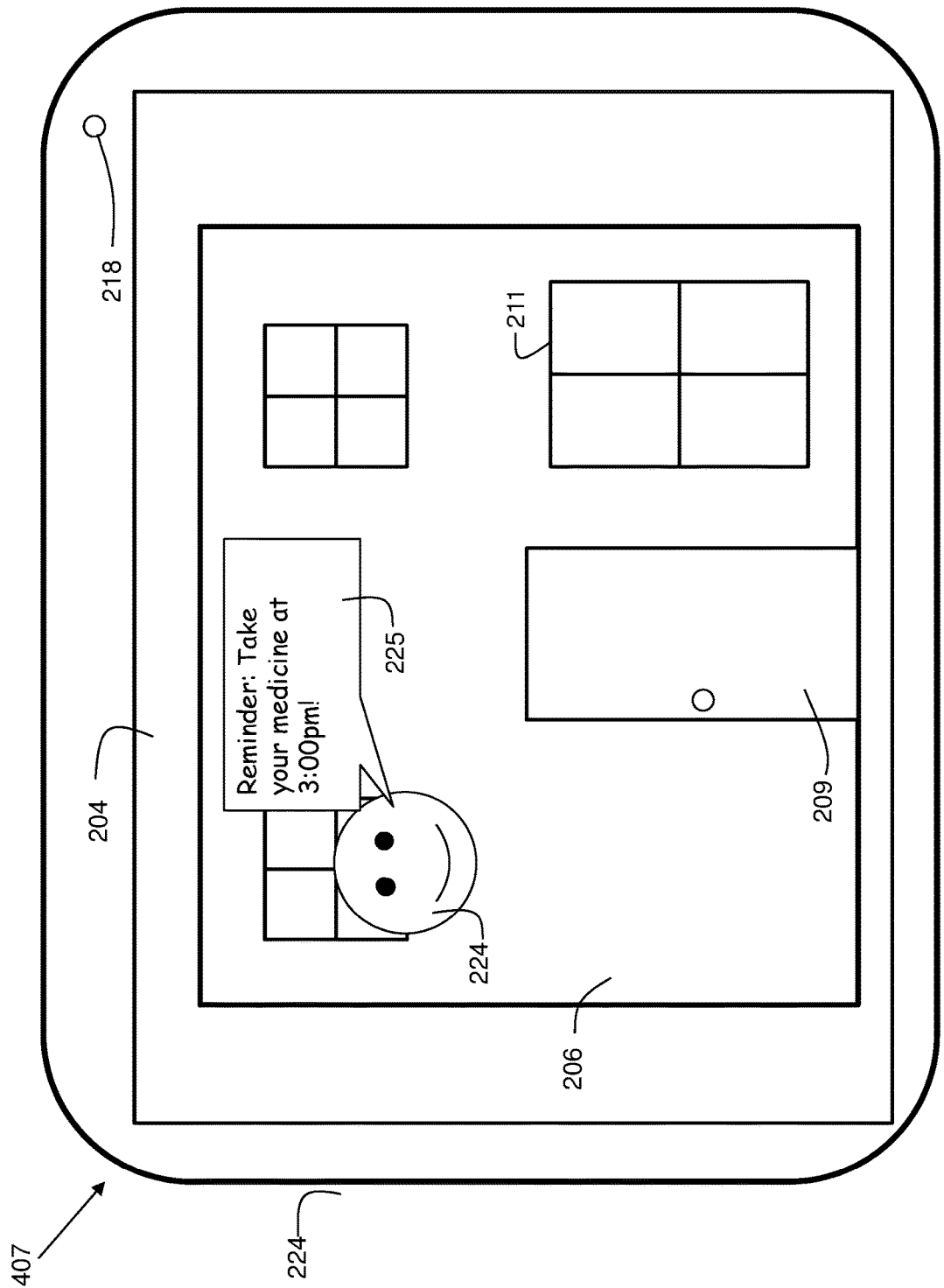
FIG. 4D is an exemplary display of an augmented reality object moved to a non-overlapping location with respect to a first object.

FIG. 4D is an exemplary display 407 of an augmented reality object moved to a non-overlapping location with respect to a first object. In embodiments, in addition to (or instead of) changing the Z-index, the AR objects 224 and 225 are moved to a different part of the display where they no longer overlap with the door 209. Thus embodiments include moving a position of the overlapping augmented reality object to a non-overlapping location with respect to the first object.

Figure 5:
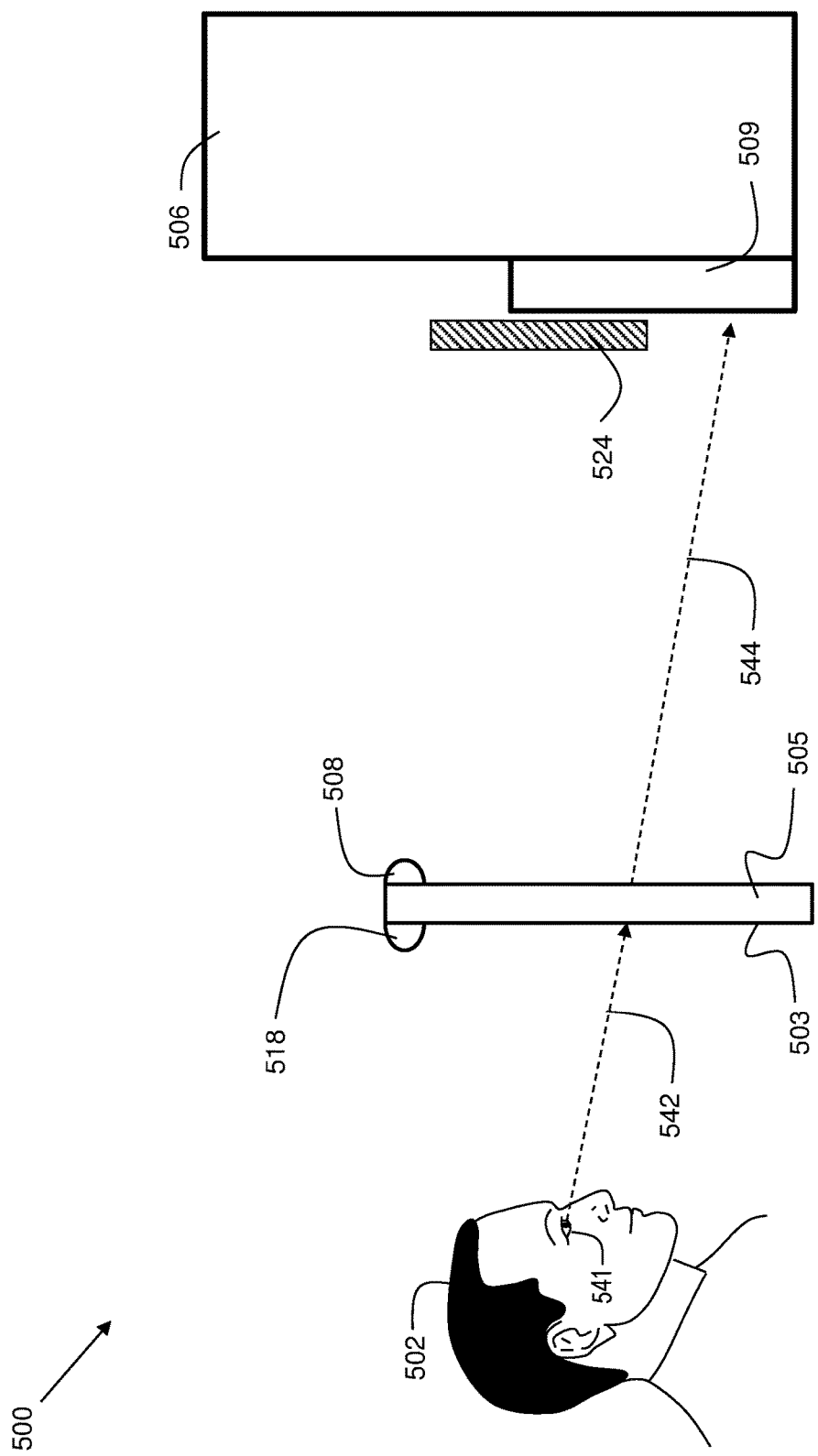
FIG. 5 illustrates a side view of a usage of embodiments of the present invention with an augmented reality object in front of a physical object.

FIG. 5 illustrates a diagram 500 of a side view of a usage of embodiments of the present invention with an augmented reality object in front of a physical object. Device 505 has user facing camera 518 and forward facing camera 508. The user 502 has eye 541 gazing along a line of sight 542, that is directed towards screen 503 of device 505. Line 544 is an extrapolation of the line of sight extending to door 509 of building 506. Augmented reality object 524 is shown positioned in front of door 509. The building 506 and door 509 are real objects captured in the forward facing camera 508, but the AR object shown is not a real object, but instead a representation displayed on screen 503 of device 505.

Figure 6:
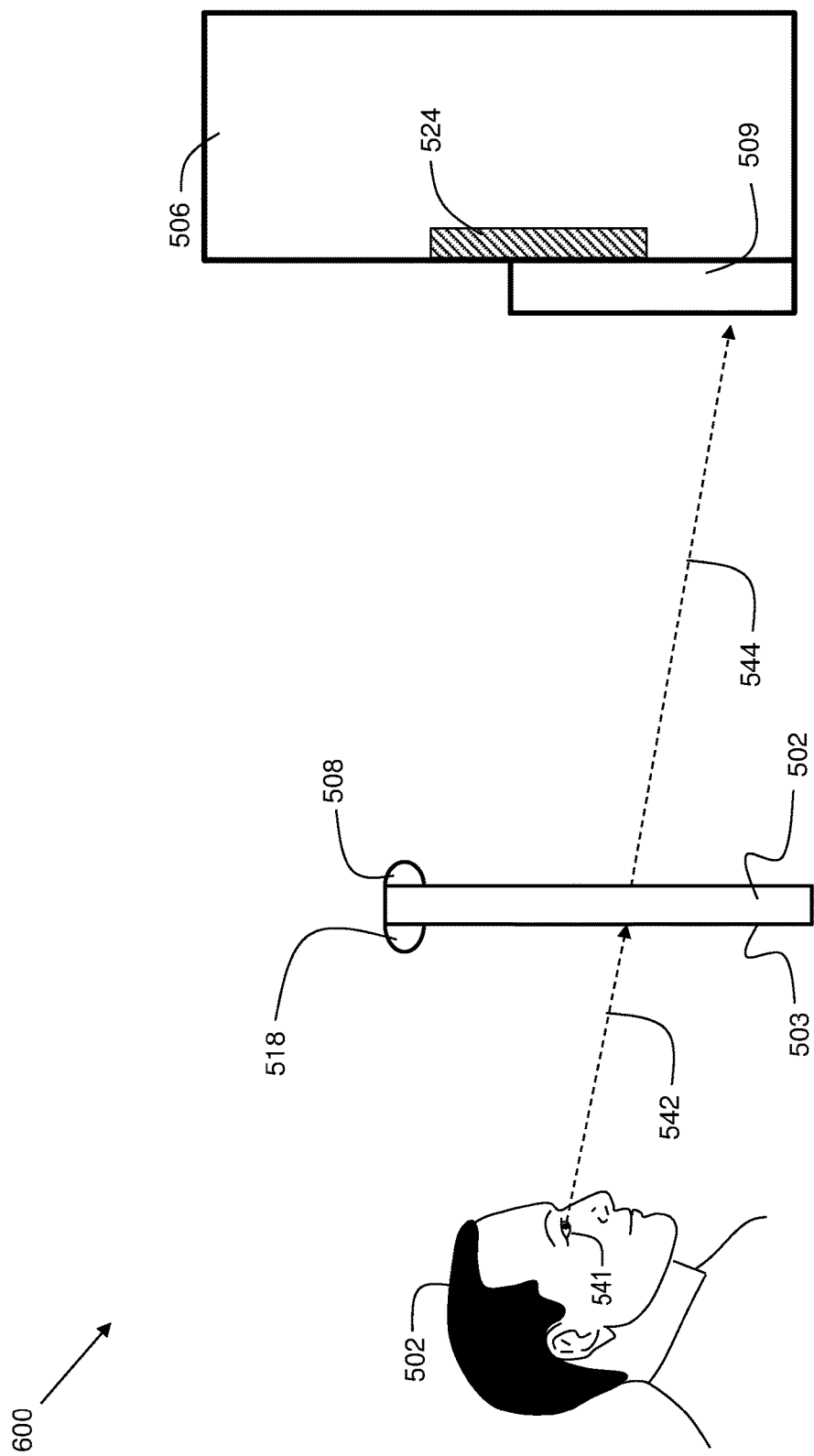
FIG. 6 illustrates a side view of a usage of embodiments of the present invention with an augmented reality object behind a physical object.

FIG. 6 illustrates a diagram 600 of a side view of a usage of embodiments of the present invention with an augmented reality object behind a physical object. Embodiments may include, responsive to detecting an eye gesture, reverting the Z-index for the augmented reality object. In the example, the scenario is the same as in FIG. 5, except that now the AR object 524 is reverted to a position behind the door 509, as a result of a detection of the user gazing at the direction of the door 509 for a predetermined amount of time (e.g., six seconds).

It should be recognized that diagrams 500 and 600 are representations. The AR object is not real and, accordingly, is not actually positioned in front of or behind the door in reality. The AR object is shown on the display 503. The display also shows the real world objects captured by forward facing camera 508.

The eye gesture may be any suitable gesture. In some embodiments, detecting an eye gesture comprises detecting a blink pattern. In some embodiments, the detecting of a blink pattern comprises detecting a predetermined first time period of closed eyes, followed by a predetermined second time period of opened eyes. For example, the pattern may be three seconds of eyes closed, followed by five seconds of eyes open. If the system detects that pattern, then the Z-index of the relevant AR object is adjusted (e.g. reverted).

In some embodiments, detecting a blink pattern comprises detecting a predetermined first time period of a first eye closed and a second eye opened, followed by a predetermined second time period of the first eye opened and the second eye opened. For example, the pattern may be three seconds of a first eye opened and a second eye closed, followed by six seconds of the first eye opened and the second eye opened. If the system detects that pattern, then the Z-index of the relevant AR object is adjusted.

In embodiments, detecting an eye gesture comprises detecting a wink pattern. In some embodiments, the detecting of a wink pattern comprises detecting a predetermined number of winks, followed by a predetermined second time period with eyes open, followed by a second predetermined number of winks. For example, the pattern may be four winks, followed by three seconds of eyes open, followed by three winks. If the system detects that pattern, then the Z-index of the relevant AR object is adjusted.

In embodiments, detecting an eye gesture comprises detecting an eye gaze pattern. In some embodiments, the detecting of an eye gaze pattern comprises detecting a gaze in a particular direction for a predetermined period of time, followed by a gaze in another direction for a second predetermined period of time. The direction could be left, right, up, down, etc. It can be instead a rolling of the eyes—from the left to the right, or top to bottom, etc. For example, the pattern may be a gaze to the left for two seconds, followed by a gaze upward for two seconds. If the system detects that pattern, then the Z-index for the relevant AR object is adjusted. Thus, in embodiments, detecting an eye gaze pattern comprises detecting eyes focused in a first direction for a predetermined first time period, followed by detecting the eyes focused in a second direction for a predetermined second time period.

Figure 7:
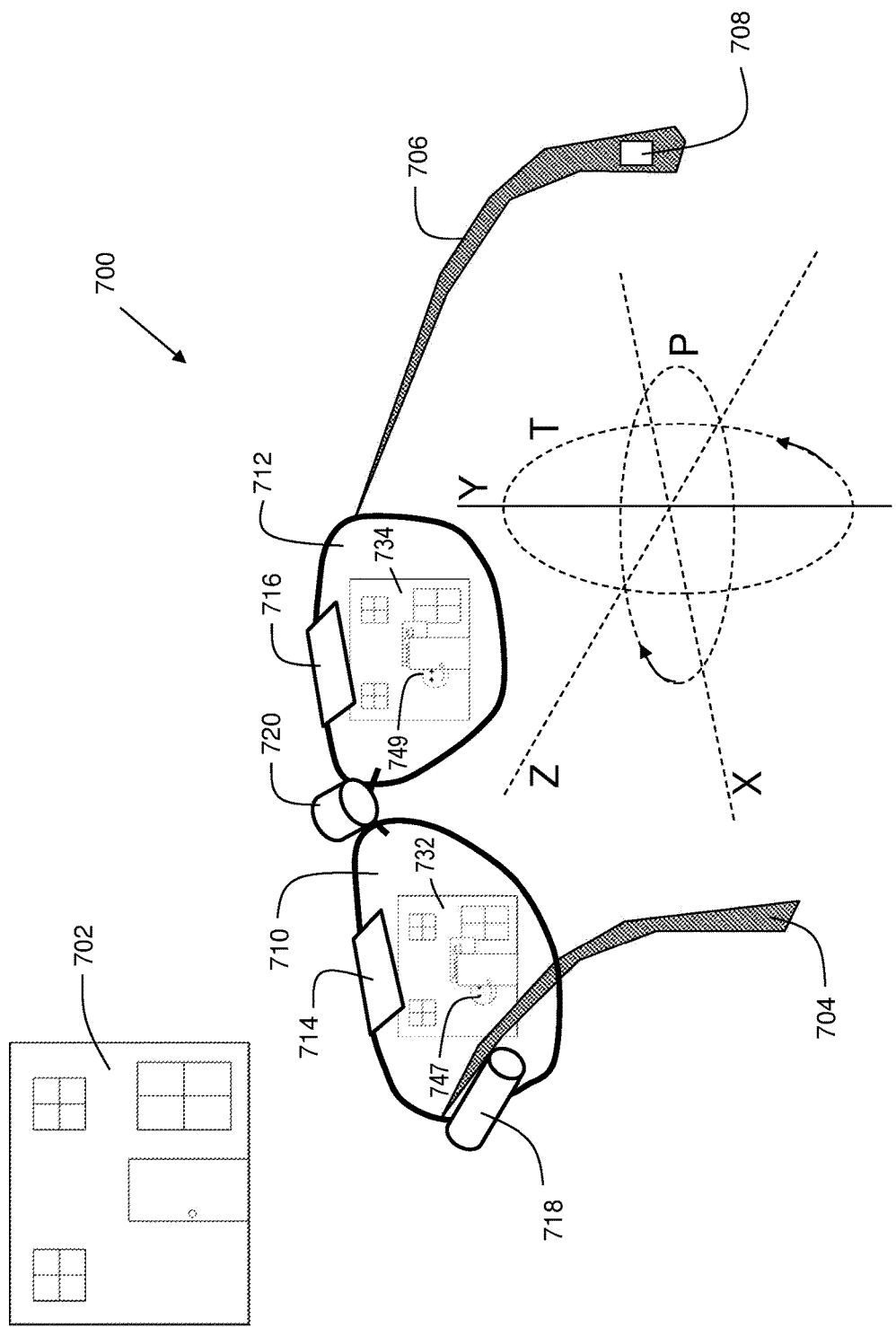
FIG. 7 shows an eyewear apparatus in accordance with embodiments of the present invention.

FIG. 7 shows an eyewear apparatus 700 in accordance with embodiments of the present invention. Embodiments may include an eyewear apparatus comprising a first lens configured and disposed to be worn in front of a first eye of a user, a second lens configured and disposed to be worn in front of a second eye of a user, a first projection mechanism configured and disposed to display the augmented reality object on the first lens, and a second projection mechanism configured and disposed to display the augmented reality object on the second lens.

In the example, eyewear apparatus 700 comprises arms 704 and 706 configured to rest on a user's ears, and lenses 710 and 712 configured to be worn in front of the user's eyes. Eyewear apparatus 700 further comprises processing module 708 that contains some or all of the modules described with respect to device 100 in FIG. 1. Projection devices 714 and 716 project AR images onto the lenses 710 and 712. Eyewear apparatus 700 comprises a user facing camera 720 and a forward facing camera 718. Images 732 and 734 of the physical object 702 are seen through the lenses. AR objects 747 and 749 are seen projected onto the lenses 710 and 712, respectively. Embodiments may utilize projectors, beam splitters, waveguides, and/or other suitable technologies to render images on the lenses. In accordance with embodiments of the present invention, AR objects 747 and 749 may be rendered as "behind" all or part of the respective images 732 and 734 of the physical object 702.

In embodiments, the user wears the eyewear apparatus 700, and moves his/her gaze and/or head around as he/she looks around at the surroundings. The dimensions of motion are labeled X, Y, and Z. The tilt path, labeled T, is the amount the user tilts his/her head. The pan dimension, labeled P, is the amount the user moves his/her head left and right.

In embodiments, as the user moves his/her head or his/her body, the processor (102 of FIG. 1) periodically recalculates an overlap region of an AR object and the object it is obscuring. Based on a new set of overlap pixels, the opacity parameter (alpha) is adjusted accordingly. Pixels that were previously covering the first object but are no longer covering the object as a result of head motion have their corresponding opacity parameter reverted to its previous setting (e.g., opaque). Pixels that were previously not covering the first object but are now covering the object as a result of head motion have their corresponding opacity parameter set to a transparent (or partially transparent) setting to allow the first object that is "behind" the AR object to become visible.

In embodiments, the eyewear apparatus may utilize an optical combiner, such as a polarized beam combiner, and/or an off-axis combiner. Some embodiments may utilize a waveguide grating or waveguide hologram to extract a collimated image guided by total internal reflection (TIR) in a waveguide pipe. Any suitable projection and/or image combining technique may be used.

Figure 8:
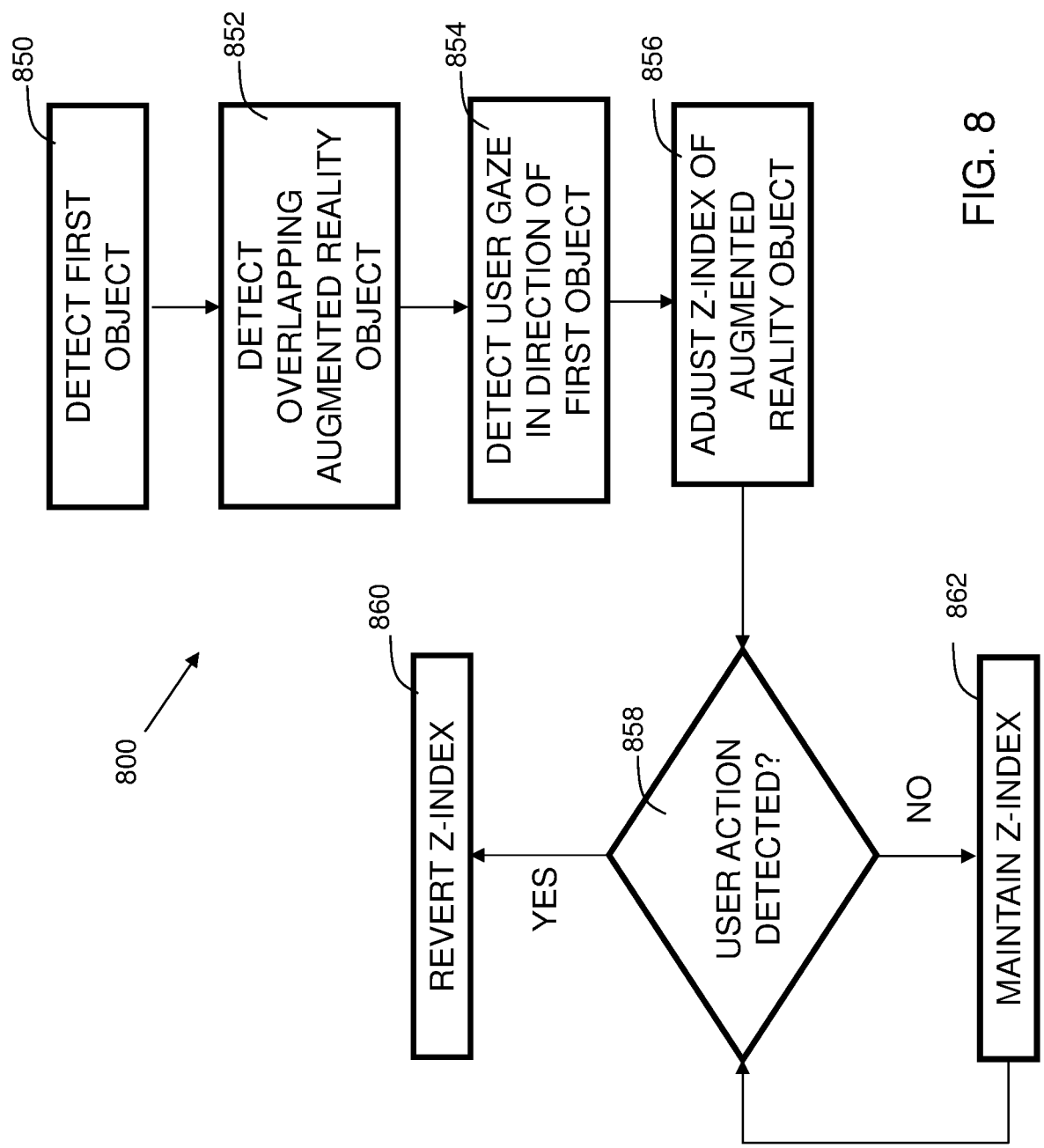
FIG. 8 is a flowchart 800 indicating process steps for embodiments of the present invention.

FIG. 8 is a flowchart 800 indicating process steps for embodiments of the present invention. At 850, a first object is detected. At 852, an overlapping augmented reality object is detected. The overlap may be partial or complete. At 854, a user gaze is detected in the direction of the first object for a predetermined period of time. At 856, a Z-index of the augmented reality object is adjusted. At 858, it is determined whether a user action is detected. The user action indicating that a user desires the Z-index adjusted is predetermined. If the user action is detected, at 860, the Z-index is reverted. If the user action is not detected, at 862, the Z-index is maintained.

Figure 9:
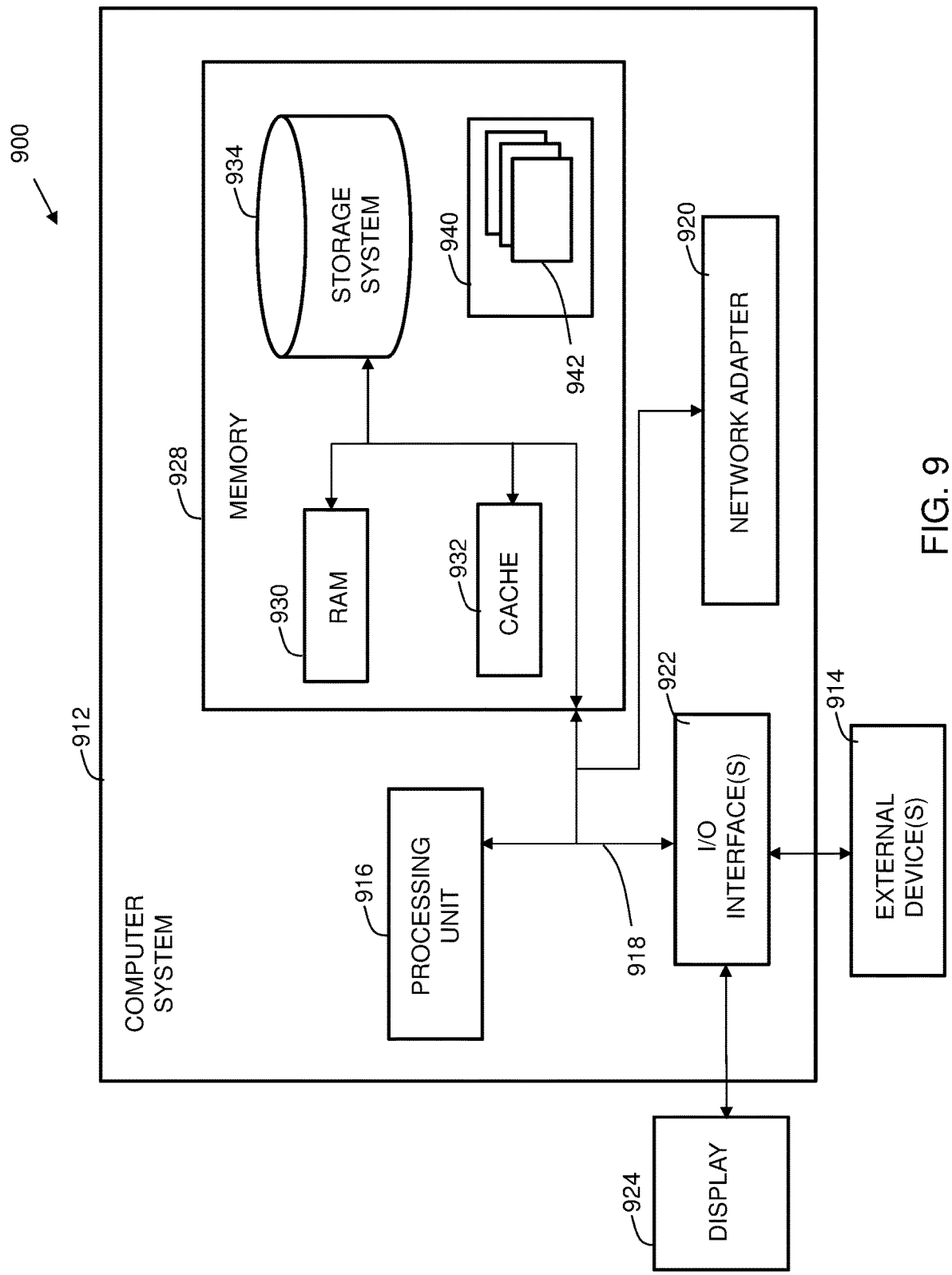
FIG. 9 shows additional details of an embodiment of the present invention.

Referring now to FIG. 9, a computerized implementation 900 of an embodiment for controlling a Z-index of an augmented reality object in an augmented reality system is described in further detail. Computerized implementation 900 is only one example of a suitable implementation and is not intended to suggest any limitation as to the scope of use or functionality of embodiments of the invention described herein. Regardless, computerized implementation 900 is capable of being implemented and/or performing any of the functionality set forth hereinabove.

In computerized implementation 900, there is a computer system 912. Examples of well-known computing systems, environments, and/or configurations that may be suitable for use with computer system 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 912 is intended to demonstrate that some or all of the components of implementation 900 could be deployed, managed, serviced, etc., by a service provider who offers to implement, deploy, and/or perform the functions of the present invention for others.

Computer system 912 is intended to represent any type of computer system that may be implemented in deploying/realizing the teachings recited herein. Computer system 912 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 912 represents an illustrative system for gathering time-annotated web interaction and biometric sensor data of web page users to extrapolate emotional responses to a web page and generating an aggregated emotional map indicative of the emotional responses. It should be understood that any other computers implemented under the present invention may have different components/software, but can perform similar functions.

Computer system 912 in computerized implementation 900 is shown in the form of a general-purpose computing device. The components of computer system 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 916 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 916 collects and routes signals representing inputs and outputs between external devices 914 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 916 executes computer program code, such as program code for gathering time-annotated web interaction and biometric sensor data of web page users to extrapolate emotional responses to a web page and generating an aggregated emotional map indicative of the emotional responses, which is stored in memory 928, storage system 934, and/or program/utility 940. While executing computer program code, processing unit 916 can read and/or write data to/from memory 928, storage system 934, and program/utility 940.

Computer system 912 typically includes a variety of computer system readable media. Such media may be any available media that is accessible by computer system 912, and it includes both volatile and non-volatile media, removable and non-removable media.

System memory 928 can include computer system readable media in the form of volatile memory, such as random access memory (RAM) 930 and/or cache memory 932. Computer system 912 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention. Program code embodied on a computer readable medium may be transmitted using any appropriate medium including, but not limited to, wireless, wireline, optical fiber cable, radio-frequency (RF), etc., or any suitable combination of the foregoing.

Program/utility 940, having a set (at least one) of program modules 942, may be stored in memory 928 by way of example, and not limitation. Memory 928 may also have an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system 912 may also communicate with one or more external devices 914 such as a keyboard, a pointing device, a display 924, etc.; one or more devices that enable a consumer to interact with computer system 912; and/or any devices (e.g., network card, modem, etc.) that enable computer system 912 to communicate with one or more other computing devices. Such communication can occur via I/O interfaces 922. Still yet, computer system 912 can communicate with one or more networks such as a local area network (LAN), a general wide area network (WAN), and/or a public network (e.g., the Internet) via network adapter 920. As depicted, network adapter 920 communicates with the other components of computer system 912 via bus 918. It should be understood that although not shown, other hardware and/or software components could be used in conjunction with computer system 912. Examples include, but are not limited to: microcode, device drivers, redundant processing units, external disk drive arrays, RAID systems, tape drives, and data archival storage systems, etc.

As can now be appreciated, disclosed embodiments provide techniques for adjusting the Z-index of an augmented reality (AR) object. In embodiments, eye gaze and/or eye gestures can be used to change the Z-index of an AR object. In some embodiments, when an AR object covers a first object, the user gazes at the first object for a predetermined amount of time, and then the AR object Z-index is adjusted with respect to the Z-index of the first object, such that the AR object is now rendered behind the first object, such that the user can continue to view the first object. This allows the user to conveniently continue viewing the first object. Embodiments provide techniques for reverting the Z-index of the AR object at a later time when the user is ready to respond to the AR object. In this way, the user experience for augmented reality systems is enhanced. Additionally, in some embodiments, the user gaze can focus on the AR object instead of the first object, in which case no Z-index adjustments are made.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method comprising:
   detecting a first object as currently focused on by a user;
   detecting presence of an overlapping augmented reality object that obstructs a view of the first object;
   determining that the user is maintaining gaze on the first object for at least a predetermined threshold period of time;
   rendering a confirmation message;
     wherein the confirmation message comprises a first area and a second area,
     wherein the first area comprises an indication that adjustment is desired, and
     wherein the second area comprises an indication that adjustment is not desired;
   detecting the user gaze on a first area of the confirmation message, and
   responsive to the determination and the detection of the user gaze on the first area of the confirmation message, adjusting an opacity parameter of the augmented reality object.

2. The computer-implemented method of claim 1, wherein the adjusting the opacity parameter comprises reverting the Z-index for the augmented reality object.

3. The computer-implemented method of claim 1, wherein the overlapping augmented reality object only obstructs a partial view of the first object.

4. The computer-implemented method of claim 3, wherein the adjusting the opacity parameter is performed only for the obstructing portion of the augmented reality object.

5. The computer-implemented method of claim 1, further comprising moving a position of the overlapping augmented reality object to a non-overlapping location with respect to the first object.

6. The computer-implemented method of claim 1, wherein the first object is a physical object.

7. The computer-implemented method of claim 1, wherein the first object is a virtual reality object.

8. An electronic communication device comprising:
   a forward-facing digital camera;
   a user-facing digital camera;
   a processor;
   a memory coupled to the processor, the memory containing instructions, that when executed by the processor, perform the steps of:
     detecting a first object as currently focused on by a user;
     detecting presence of an overlapping augmented reality object that obstructs a view of the first object; and
     determining that the user is maintaining gaze on the first object for at least a predetermined threshold period of time;
   rendering a confirmation message;
     wherein the confirmation message comprises a first area and a second area,
     wherein the first area comprises an indication that adjustment is desired, and
     wherein the second area comprises an indication that adjustment is not desired;
   detecting the user gaze on a first area of the confirmation message, and
   responsive to the determination and the detection of the user gaze on the first area of the confirmation message, adjusting an opacity parameter of the augmented reality object.

9. The electronic communication device of claim 8, wherein the adjusting the opacity parameter comprises changing the Z-index for the augmented reality object.

10. The electronic communication device of claim 8, wherein the overlapping augmented reality object only obstructs a partial view of the first object.

11. The electronic communication device of claim 10, wherein the adjusting the opacity parameter is performed only for the obstructing portion of the augmented reality object.

12. The electronic communication device of claim 8, wherein the memory further comprises instructions, that when executed by the processor, perform the step of, moving a position of the overlapping augmented reality object to a non-overlapping location with respect to the first object.

13. The electronic communication device of claim 8, wherein the first object is a physical object or a virtual reality object.

14. The device of claim 8, further comprising an eyewear apparatus comprising:
- a first lens configured and disposed to be worn in front of a first eye of a user;
- a second lens configured and disposed to be worn in front of a second eye of a user;
- a first projection mechanism configured and disposed to display the augmented reality object on the first lens; and
- a second projection mechanism configured and disposed to display the augmented reality object on the second lens.

15. A computer program product comprising a computer readable storage medium having program instructions embodied therewith, the program instructions executable by a processor to cause the electronic computing device to:
- detect a first object as currently focused on by a user;
- detect presence of an overlapping augmented reality object that obstructs a view of the first object;
- determine that the user is maintaining gaze on the first object for at least a predetermined threshold period of time;
- render a confirmation message;
  - wherein the confirmation message comprises a first area and a second area,
  - wherein the first area comprises an indication that adjustment is desired, and
  - wherein the second area comprises an indication that adjustment is not desired;
- detect the user gaze on a first area of the confirmation message, and
- responsive to the determination and the detection of the user gaze on the first area of the confirmation message, adjust an opacity parameter of the augmented reality object.

16. The computer program product of claim 15, wherein the adjusting the opacity parameter comprises changing the Z-index for the augmented reality object.

17. The computer program product of claim 15, wherein the overlapping augmented reality object only obstructs a partial view of the first object.

18. The computer program product of claim 17, wherein the adjusting the opacity parameter is performed only for the obstructing portion of the augmented reality object.

19. The computer program product of claim 15, further comprising moving a position of the overlapping augmented reality object to a non-overlapping location with respect to the first object.

20. The computer program product of claim 15, wherein the first object is a physical object or a virtual reality object.

* * * * *